United States Patent
McArdle

(10) Patent No.: US 7,283,993 B2
(45) Date of Patent: Oct. 16, 2007

(54) METHODS, SYSTEMS, AND MEDIA FOR HANDLING ERRORS IN SCRIPT FILES

(75) Inventor: James Michael McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 10/835,107

(22) Filed: Apr. 29, 2004

(65) Prior Publication Data

US 2005/0256858 A1    Nov. 17, 2005

(51) Int. Cl.
*G06F 17/30* (2006.01)
(52) U.S. Cl. ............................................. 707/3; 707/4
(58) Field of Classification Search .................. 707/3, 707/4
See application file for complete search history.

(56) References Cited

U.S. PATENT DOCUMENTS

| | | | |
|---|---|---|---|
| 2002/0188584 A1 | 12/2002 | Ghannam et al. | |
| 2003/0058277 A1* | 3/2003 | Bowman-Amuah | 345/765 |
| 2003/0105732 A1* | 6/2003 | Kagalwala et al. | 707/1 |
| 2003/0229620 A1* | 12/2003 | Carlson et al. | 707/2 |
| 2004/0254948 A1* | 12/2004 | Yao | 707/101 |
| 2005/0193269 A1* | 9/2005 | Haswell et al. | 714/38 |

OTHER PUBLICATIONS

McArdle, James M., "SQL Ignore Error Feature", IP.com Prior Art Database (https://priorart.ip.com) (document No. IPCOM000016793D) (Jul. 15, 2003 UTC) (disclosed by IBM) (Main web page http://www.ip.com).

* cited by examiner

*Primary Examiner*—Alford W Kindred
(74) *Attorney, Agent, or Firm*—Herman Rodriguez; Schubert Osterrieder & Nickelson PLLC

(57) ABSTRACT

Methods, systems, and media are disclosed for handling errors resulting in error messages while executing a script file such as a Sequential Query Language (SQL) script. Embodiments may include one or more databases such as databases interconnected via a network, which include or have the ability to create and/or execute script files with on-error statements. Script files with on-error statements may include an error identifier and a resolution identifier. Each error identifier may identify one or more errors associated with the resolution identifier and the resolution identifier may identify a way to handle the error. Resolution identifiers may provide one or more error-recovery statements, calls for execution of a stored procedure, or other functions to correct, log, or ignore errors and continue or terminate execution of script files. Many embodiments include a command line processor that can recognize and implement the on-error statements.

28 Claims, 5 Drawing Sheets

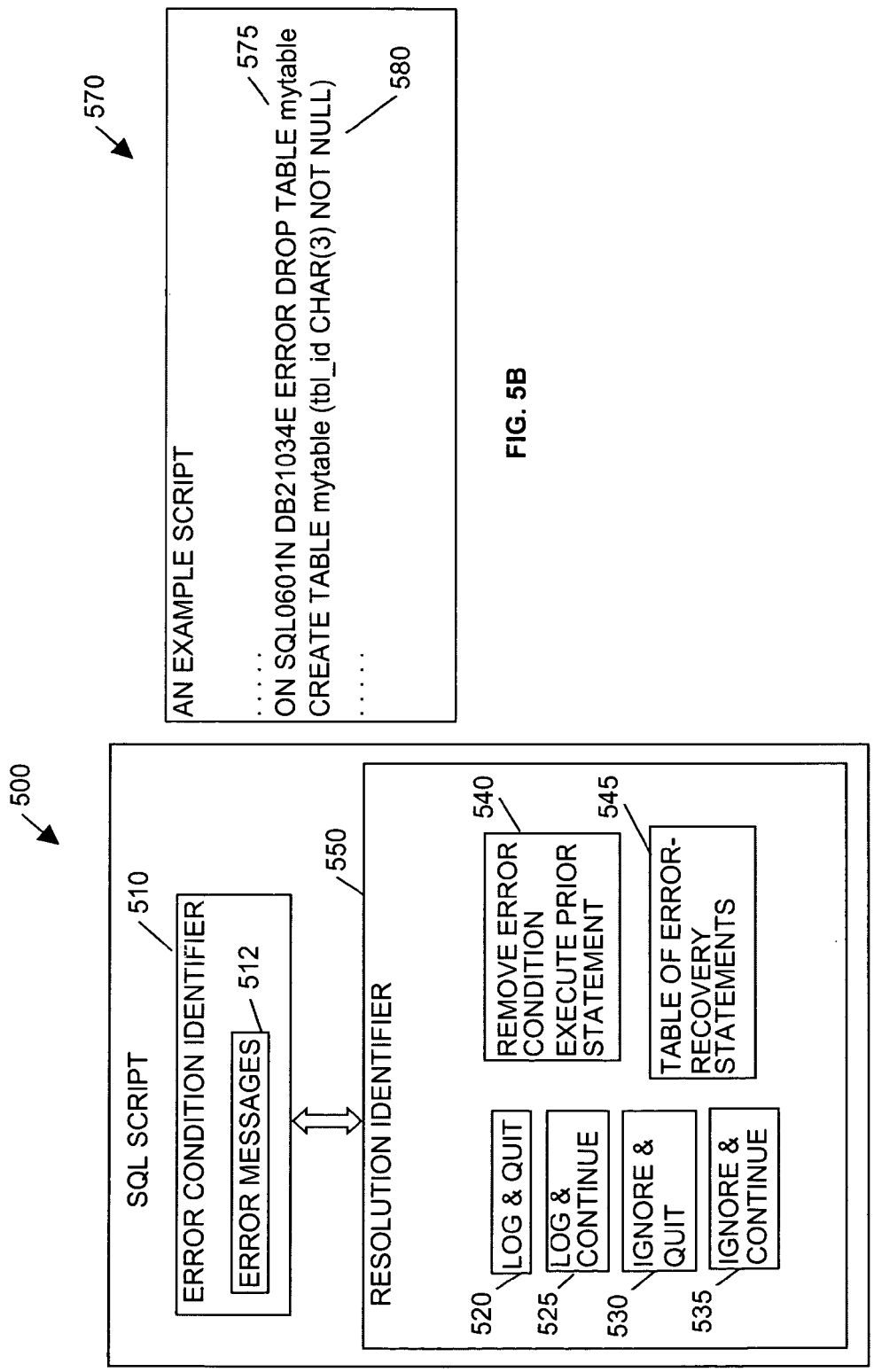

METHODS, SYSTEMS, AND MEDIA FOR HANDLING ERRORS IN SCRIPT FILES

FIELD OF INVENTION

The invention generally relates to database management software. More particularly, the invention relates to methods, systems, and media for handling errors in Sequential Query Language (SQL) scripts and other programming languages with similar error resolution limitations.

BACKGROUND

Sequential Query Language (SQL) is a very powerful and popular query language used in various Database Management Systems. SQL, although named as a query language, is often used to design applications in the form of scripts. For example, SQL applications facilitate access to and manipulation of data in large, relational, database management systems, such as Oracle™, Sybase™, Informix™, Microsoft SQL Server™, Microsoft Access™, and other customized database interfaces. Each variation offers different capabilities, allowing users to select the variation best suited for them and their particular applications.

Multiple scripts may be linked to operate like application programs and may include embedded program builds to enhance functionalities of the scripts. Program builds are short program segments in other programming languages, such as an executable application in machine language or a batch file, that can be linked to scripts to create quite powerful database applications. For example, a user may want to transfer some contact information from a specific-use database such as the address book of Microsoft Outlook™ to another address book on a personal digital assistant (PDA). A script may be executed to export some portion of data from the address book of Microsoft Outlook™, essentially writing the data to a text file and then, the script may call an executable program to convert the text file into a format that can be imported by the address book software on the PDA.

SQL is a powerful interface between the user and database management systems. Typical applications of SQL include management and manipulation of large amount of data by relational databases. Each data manipulation typically corresponds to a modification to data in the database that can be performed by one or more manual steps or lines of the script (SQL statements). Generally, when users find that certain combinations of manual steps are performed repeatedly or that a large number of coordinated data manipulations must be implemented in a particular order to accomplish their goal, the users may economize on time, improve efficiency, and reduce the occurrence of errors by writing scripts to manipulate the data.

As an Illustration, applications such as census databases require the generation of millions of data tables. These data tables also require periodic updates. More specifically, census databases require multiple tables for even the smallest geographic region to describe the demographics of that region. In turn, these regional databases are combined and manipulated to arrive at sub-regional, regional, and eventually characteristics of the population for the entire nation. Each such table may represent different characteristics corresponding to the geographic region under consideration. Further, these census tables need to be updated at different time intervals with estimated values of the parameters.

Similarly, corporate data may contain data corresponding to employees, corporate subsidiaries, products, marketing and so on that may consist of many tables and views corresponding to various parameters. Again, these tables and views need continuous updating.

SQL command line processors typically execute lines of SQL scripts sequentially and do not permit rectification of errors in the SQL command lines, nor the identification of error causing command lines. Often times the developers recognize harmless error messages and ignore further rectification of the script for various reasons including inability of the processor to suppress these errors. The script users, however, become concerned and suspect that the script may not be performing its intended functions.

Errors may occasionally result in command lines designed to create tables, views, and other parameters, for example, when corresponding items may already exist. Under such circumstances execution of the script may halt, or may give one or more error messages and continue script execution, possibly carrying one or more errors in the results of executing the script. The errors are generally difficult to identify, especially when the scripts are large and/or complex. Programmers spend a significant amount of time diagnosing these errors, which adds to cost and efficiency of the operations. Therefore, it would be desirable to add ability to locate and diagnose errors in the scripts. It would be even better if the errors could be corrected automatically and the scripts continue to run correctly.

SUMMARY OF THE INVENTION

Embodiments of the invention generally provide methods, systems, and media for error-recovery from execution of a Sequential Query Language (SQL) script. Generally, when an error condition in a SQL statement is encountered during execution of the SQL script, an error message is generated and the execution terminates. In one embodiment, the method generally includes storing an association between an error condition and an error-recovery statement based upon execution of an on-error statement in the SQL script and determining an occurrence of the error condition. The error condition may correspond to an error message generated by the command line processor in response to the execution of the SQL script. The embodiment may then identify the association between the error-recovery statement and the error condition and execute the error-recovery statement to resolve the occurrence of an error condition.

In another embodiment, the invention provides a command line processor to implement the method of the invention. The command line processor includes an execution module, a logic module, and a processing module. The execution module may store an association between an error condition and an error-recovery statement, based upon execution of an on-error statement in a script file, and may determine an occurrence of the error condition. The error condition corresponds to an error message generated by the command line processor in response to the execution of the script file. The logic module may identify the association between the error-recovery statement and the error condition for the script file to select the error-recovery statement based upon the association. And the processing module may execute the error-recovery statement to resolve the occurrence of the error condition.

In a yet another embodiment, the invention provides a machine-accessible medium containing instructions, which when executed by a machine, cause the machine to perform operations. The operations generally include storing an association between an error condition and an error-recovery statement based upon execution of an on-error statement in a script file. Then, the embodiment determines an occurrence of the error condition, which may involve determining the occurrence of an error message associated with the error condition. The error message is generated by the command line processor in response to the execution of the script file. Upon determining the occurrence of the error condition, the operations typically identify the association between the error-recovery statement and the error condition and execute the error-recovery statement to resolve the occurrence of error condition.

In one embodiment, the invention provides an SQL script for handling an error condition. The script may include an error condition identifier and a resolution identifier. The error condition identifier may identify an error message to be generated by a command line processor in response to an error during execution of the script. While the resolution identifier may associate the error message with an error-recovery statement. The error-recovery statement, upon execution by the command line processor, is designed to resolve the error condition.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5A depicts an embodiment of a script file for handling a run-time error.

FIG. 5B depicts an example of a SQL script for the script file in FIG. 5A.

DETAILED DESCRIPTION OF THE EMBODIMENTS

Figure 1:
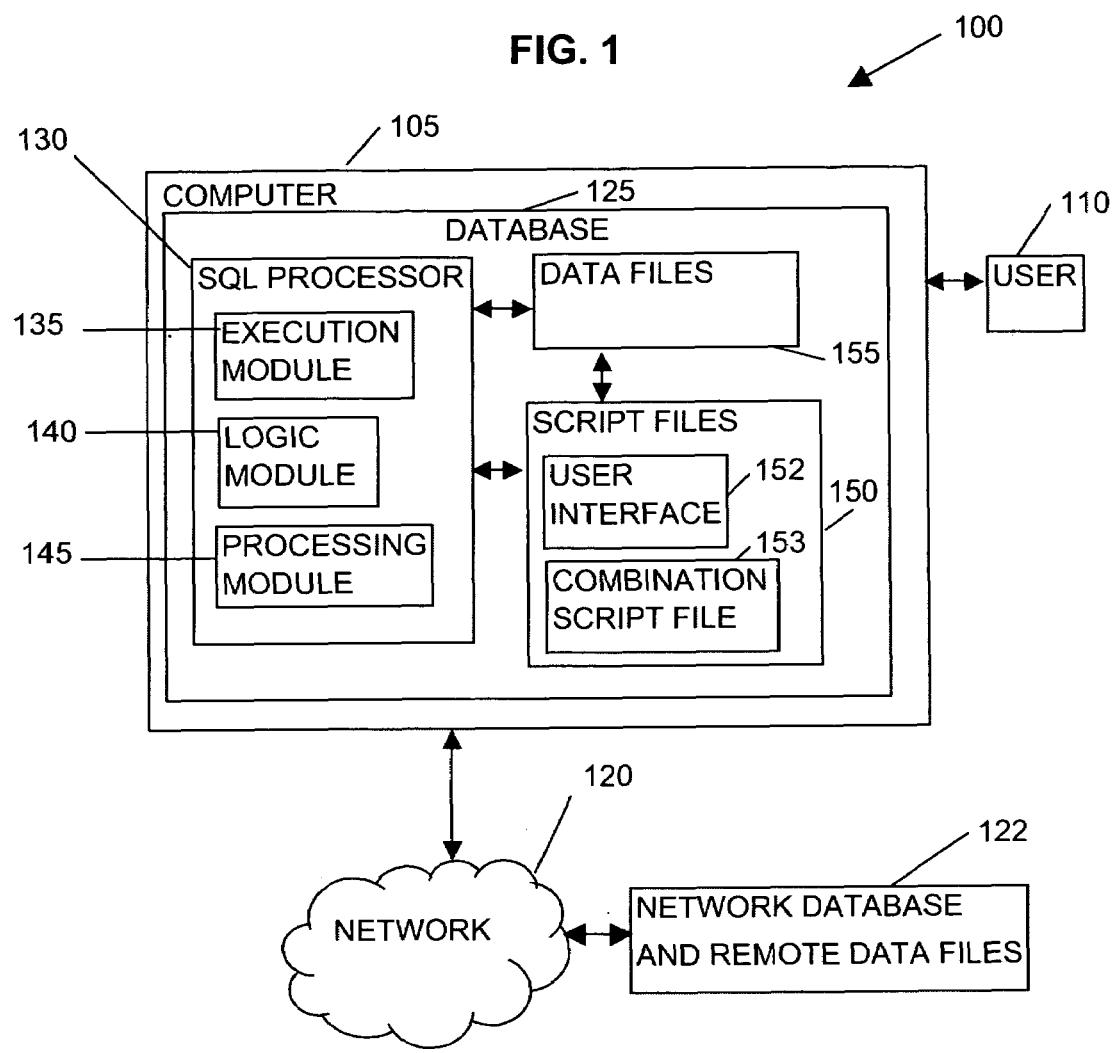
FIG. 1 depicts a system including a computer as part of a network and a user of the system to manipulate the data via script files and a SQL processor.

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for error-recovery from execution of a script such as a script for data management are contemplated. Embodiments may include one or more databases such as databases interconnected via a network, which include or have the ability to create and/or execute script files with error handling capabilities such as Sequential Query Language (SQL) scripts. For instance, a user may access and manage data locally and/or globally over the network via one or more scripts. One or more of the scripts include an on-error statement with an error identifier and a resolution identifier. The error identifier may identify the error and the resolution identifier may identify a way to handle the error in the form of one or more error-recovery statements. More specifically, the error identifier may identify the error via an error condition. In some embodiments the error condition identifies one or more errors as a list of error messages, which may be generated by a command line processor, such as an SQL command line processor, in response to the errors. In other embodiments, the error condition represents one or more error messages that can be identified by a command line processor.

The error-recovery statement, on the other hand, provides one or more executable statements, or even calls for other stored procedures, to resolve the error in a manner desirable by the programmer. The stored procedures may, for instance, include executable applications or other programs written and/or stored in another language. In particular, a programmer may want to ignore certain errors and continue with the execution of the corresponding script, log errors and continue with execution of the script, terminate execution of the script, correct the error and continue execution of the script, or other, depending upon the script and the error. As an illustration, the programmer may include a statement in a script to create a database. If the database has already been created, the programmer, depending upon the programmer's expectation of and/or use for the database, may want to ignore the error and just use the existing database or delete the existing database and create a new database.

Further embodiments may include a command line processor typically designed to execute each command line in a script sequentially. The command line processor may recognize and implement on-error statements with error identifiers and resolution identifiers. For instance, such command line processors may execute an on-error statement that includes both the error identifier and the resolution identifier and, in response, store the association between the corresponding errors and the resolution identifier in, e.g., a table. The command line processor may then, upon detecting an error, look-up the error in the table and execute the corresponding error-recovery statement as identified by the resolution identifier.

While specific embodiments will be described below with reference to a SQL command line processor and SQL scripts, those of skill in the art will realize that embodiments of the present invention may advantageously be implemented in other, similar scripting or programming languages that lack error handling aspects of the invention described herein:

Turning now to the drawings, FIG. 1 depicts an embodiment of a system 100 including a computer 105 as part of a network and a user 110 who uses the system 100 to manipulate the data using a SQL processor 130 and script files 150. User 110 may be an operator or another local computer system and, in other embodiments, a remote computer system. Computer system 100 normally includes a keyboard, monitor, mouse, microprocessor, memory, and peripherals, such as printers, CD-ROM devices, and modems. Regarding the network 120, the depicted network 120, for example, is a local-area network ("LAN") with a bus topology, but in other embodiments, the type and topology of the network 120 may vary. For example, the network 120 may have a star or ring topology. In addition, the location of the computer systems 100 may be geographically close together to form a LAN, such as a campus-area network ("CAN") or home-area network ("HAN"), or the computer systems 100 may be farther apart to form a wide area network ("WAN"), such as a metropolitan-area network ("MAN").

Database 125 is a software application, such as MS SQL Server™, Oracle™, and others. Database 125 includes a SQL processor 130, data files 155, and script files 150. SQL processor 130 includes code such as an executable application that can be executed by a computer 105. SQL processor 130 includes code to interpret and execute functions described in script files 150. More specifically, SQL processor includes an execution module 135, a logic module 140, and a processing module 145.

Execution module 135 may execute scripts one line at a time and sequentially. Execution module 135 may also store associations between error conditions and error-recovery statements in memory. The associations may be based upon an on-error statement in script files 150. For example, while executing user interface 152, execution module 135 may encounter an on-error statement. The on-error statement may include an error message and an error recovery statement. The error message may include an error code generated by execution module when a referenced field cannot be found. The error-recovery statement may include a command line that instructs SQL processor 130 to store a reference to the missing field in a log as well as a copy of the command line containing the reference, and then to terminate execution of the script file.

Logic module 140 may be designed to recognize associations stored in memory, which associate error-recovery statements with error conditions. Upon identifying the association, logic module 140 may communicate the association, the error-recovery statement, and/or a reference thereto to processing module 145. For example, the associations may be stored in memory in the form of a table having error codes and their associated error-recovery statements stored in the same row. Logic module 140 may search the table for the error message generated by execution module 135 and, upon identifying the row associated with the error message, pass a reference or pointer to the row to processing module 145.

Processing module 145 may receive an error recovery statement or reference thereto, process the error-recovery statement, and return normal execution to execution module 135 or terminate execution of the script file. For instance, if the error-recovery statement is one or more command lines, processing module 145 may pass the command line(s) to execution module 135. If the error-recovery statement includes a code or other indication to log the error and terminate execution of the script, processing module 145 may log the error in memory or transmit the error log to an I/O device such as a printer or the display and then terminate execution of the script file. If the error-recovery statement indicates that the error should be ignored, processing module 145 may return normal execution to execution module 135. Further, if the error-recovery statement indicates that the error is correctable and provides a statement to correct for the error, processing module 145 may effect execution of the statement and instruct execution module to re-execute the line that caused the error.

In some embodiments, processing module 145 may include capabilities to call stored procedures. For instance, a stored procedure may be in the form of a compiled C++™, PASCAL™, COBOL™, FORTRAN™, JAVA™, or other application, and processing module 145 may execute the stored procedure as, or as part of, the error-recovery statement.

As an illustration, user 110 may want to combine numerical values for two fields in each record of data files 155 so user 110 types a command with the keyboard of computer 105. Execution module 135, executing user interface 115, recognizes the command as being a reference to a combination script file 153 in script files 150 and executes combination script file 153.

Upon execution of combination script file 153, execution module 135 identifies an on-error statement. The on-error statement is a command line in the script 150 that identifies errors likely to occur by corresponding error messages, which the developer of SQL processor 130 has already identified. Execution module 135 stores an association between an error message for an invalid number during a summation function and an error-recovery statement indicating that the value of the invalid number should be determined and used to replace the invalid number, the invalid number and record number should be logged, and execution of the script file should continue.

Execution module 135 combines the contents of the fields for each record until an invalid number during a summation function is encountered. Logic module 140 identifies the error-recovery statement for processing module 140 based upon the error message produced by execution module 135. Processing module 145 determines the value of the invalid number, logs the invalid number at record number in a run-time log file, and instructs execution module to begin execution and the statement that caused the error condition with the pointer remaining at the same record and field that caused the error condition.

User 152 may interact with computer 105 via a keyboard, a mouse, or any other suitable device. In addition, user 110 may access and manipulate data files 155 of database 125 via SQL processor 130 and a user interface 152.

User interface 152 includes script file statements or lines that describe functions for execution by SQL processor 130. In many embodiments, user interface 152 allows access to and manipulation of data in data files 155 as well as related data in a network database and remote data files 122. System 100 links to a network 120 to provide ability to access the network database and remote data files 122.

Figure 2:
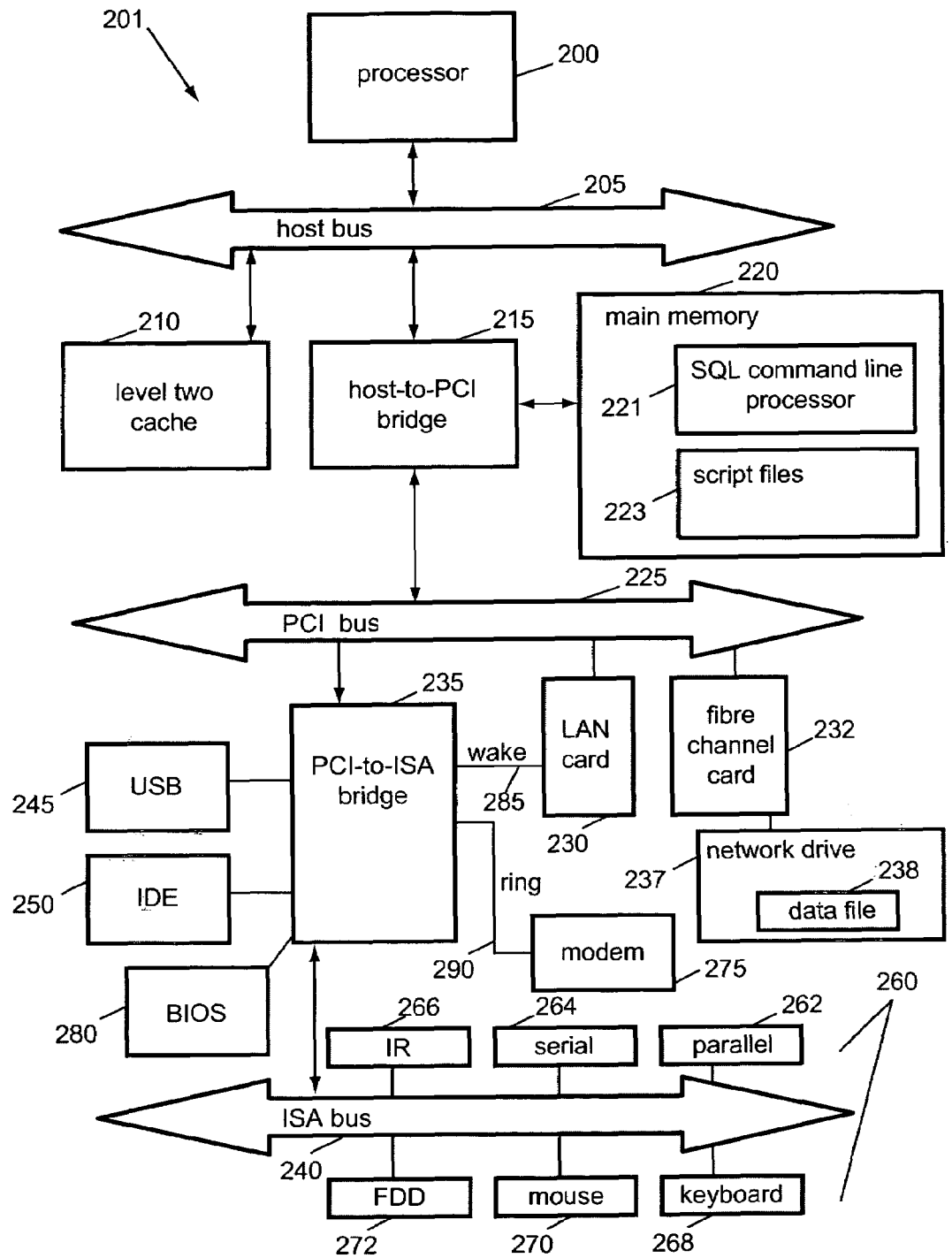
FIG. 2 depicts an embodiment of apparatus capable of performing the SQL command line processor.

FIG. 2 illustrates information handling system 201, which is a simplified example of a computer system capable of performing the operations described herein. Computer system 201 includes processor 200 that is coupled to host bus 205. A level two (L2) cache memory 210 is also coupled to the host bus 205.

Host-to-PCI bridge 215 is coupled to main memory 220, includes cache memory and main memory control functions, and provides bus control to handle transfers among PCI bus 225, processor 200, L2 cache 210, main memory 220, and host bus 205. The main memory 220 includes a SQL command line processor 221 as well as script files 223. SQL command line processor 221 executes scripts of script files 223 such as SQL scripts. SQL command line processor 221 is designed to generate an error-recovery table in main memory 220 in response to execution of on-error statements in script files 223. Upon identification of an error in the error-recovery table, SQL command line processor 221 may log the error or remove or correct the error. SQL command line processor 221 may then terminate or continue execution of the corresponding script file command line in script files 223.

Script files 223 may provide functions and an interface for a user to access and manipulate multiple related data files such as data file 238 on network drive 237. In many embodiments, one or more of the script files 223 include on-error statements so that anticipated, potential errors are handled in a manner pre-determined by the script's programmer, or at least in a manner provided by SQL command line processor 221. Advantageously, the errors may be logged and/or corrected before execution of the script file terminates.

PCI bus 225 provides an interface for a variety of devices including, for example, LAN card 230. PCI-to-ISA bridge 235 provides bus control to handle transfers between PCI bus 225 and ISA bus 240, universal serial bus (USB) functionality 245, IDE device functionality 250, and can include other functional elements not shown, such as a real-time clock (RTC), DMA control, interrupt support, and system management bus support. A fiber channel card linked to the PCI bus may also be coupled to a network drive 237. The network drive 237 may have various data files for accessing and processing by the SQL command line processor such as data file 238.

Peripheral devices and input/output (I/O) devices can be attached to various interfaces 260 (e.g., parallel interface 262, serial interface 262, infrared (IR) interface 266, keyboard interface 268, mouse interface 270, fixed disk (HDD) 272, removable storage device 272) coupled to ISA bus 240. Alternatively, many I/O devices can be accommodated by a super I/O controller (not shown) attached to ISA bus 240.

BIOS 280 is coupled to ISA bus 240, and incorporates the necessary processor executable code for a variety of low-level system functions and system boot functions. BIOS 280 can be stored in any computer readable medium, including magnetic storage media, optical storage media, flash memory, random access memory, read only memory, and communications media conveying signals encoding the instructions (e.g., signals from a network). In order to attach computer system 201 to another computer system to copy files over a network, LAN card 230 is coupled to PCI bus 225 and to PCI-to-ISA Bridge 235. Similarly, to connect computer system 201 to an ISP to connect to the Internet using a telephone line connection, modem 275 is connected to serial port 262 and PCI-to-ISA Bridge 235.

While the computer system described in FIG. 2 is capable of executing the invention described herein, this computer system is simply one example of a computer system. Those skilled in the art will appreciate that many other computer system designs are capable of performing the invention described herein.

Figure 3:
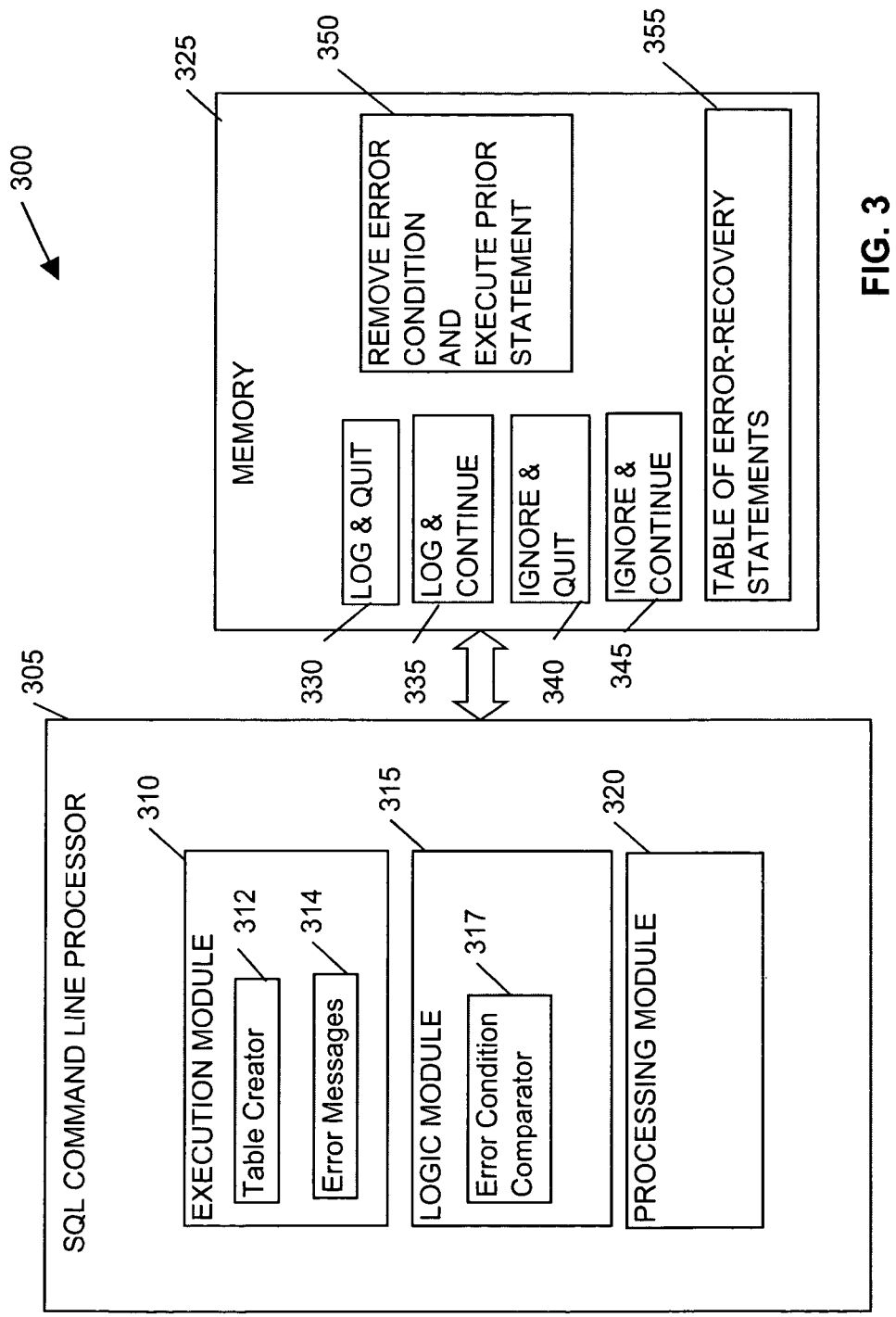
FIG. 3 depicts an example embodiment of a SQL command line processor that processes data and provides error-recovery feature.

FIG. 3 depicts an embodiment of a system 300 that provides error-recovery when used for managing and processing data. In particular, system 300 includes SQL command line processor 305 to process lines of a script file, create a table of error recovery statements 355, and return error messages 314 corresponding to one or more error conditions encountered during execution of a line of the script file.

SQL command line processor 305 includes an execution module 310, a logic module 315, and a processing module 320. Execution module 310 may include a table creator 312 to create the table of error recovery statements 355 and error messages 314 to identify run-time errors during execution of a script file and to compare those run-time errors with error conditions that are associated with error-recovery statements. Typically, the error messages 314 include a list of errors anticipated by the programmer of SQL command line processor 305. The script file developer then chooses one or more of those codes to describe a potential error during execution of a command line or a set of command lines. The selected list of errors may be developed for errors heuristically determined or anticipated for a particular script file or may be developed from experience and analysis of characteristics of the problem at hand. Again, the script developer identifies error-recovery statements to handle the expected errors. A list of error-recovery statements are associated with the error conditions and saved in a memory 325 as a table of error-recovery statements 355.

SQL command line processor 305 includes a logic module 315 to determine a resolution for the error condition generated by execution of the SQL statement. The resolution of the error condition generally involves selecting an error-recovery statement based upon an association between the error condition and the error-recovery statement in the SQL script. More specifically, logic module 315 includes an error condition comparator 317. Error condition comparator 317 compares the error message selected by execution module 310 from error messages 314 to describe the error that occurred, against error conditions in the table 355 of error-recovery statements to find the row that corresponds to the error. If a row is found to match the error, the error-recovery statement in the table 355 that is associated with that row is the error-recovery statement designed by the script developer to handle the error. Again, the developer may provide such associations between the error conditions and the error-recovery statements.

Processing module 320 may process the resolution for the error condition selected by the logic module 315. Processing the resolution may include selecting from several error-recovery statements, some of which a script developer may find to be more appropriate depending upon the stage of development and/or commercialization of the script file. The choices for processing the error conditions include but are not limited to 'Log and Quit' 330, where the error condition is saved for later retrieval/analysis and execution of the script is terminated; 'Log and Continue' 335, where one or more of the error conditions are saved for later retrieval, and execution of the script is continued; 'Ignore and Quit' 340, where the error condition is ignored and execution of the script is terminated; 'Ignore and Continue' 345, where the error condition is ignored execution of the script is continued; and 'Remove Error Condition and Execute Prior Statement' 350, where the error condition is removed by, e.g., another SQL statement, and the statement that caused the error message is re-executed. Other options of similar nature may be incorporated by those skilled in the art without diverting from spirit of the disclosure herein.

As an illustration, the choice of 'Log and Quit' 330 may be appropriate, e.g., in the initial stages of development of a script where the developer may be interested in easily locating the error causing SQL statement in a long script, diagnosing the problem, determining error conditions, and determining corresponding error-recovery statements. The choice of 'Log and Continue' 335 may be appropriate, e.g., in the further state of development of the script where errors in conjunction with a single SQL statements may have been identified but overall results of execution of the full script need verification of accuracy. The choice of 'Ignore and Quit' 340 may be appropriate, e.g., in stages of development of the script where the developer may have identified harmless errors but may like to further evaluate the error causing statement. The choice of 'Ignore and continue' 345 may be appropriate, e.g., in stages of development of the script where the developer may have identified certain harmless errors but would like to continue execution of subsequent SQL statements in the script to find other error conditions. The choice of 'Remove Error Condition and Execute Prior statement' 350 may be appropriate, e.g., in a fully developed script where the developer may have identified errors and corresponding error-recovery statements. Such situation occur, for example, where tables or views with certain names have been created during the first execution of the script but subsequent execution of the script would cause error conditions and possible termination of the script. Under these conditions, it would be appropriate to remove the tables and views created during first execution, execute other desired SQL statements, and recreate tables and views with the same names.

Figure 4:
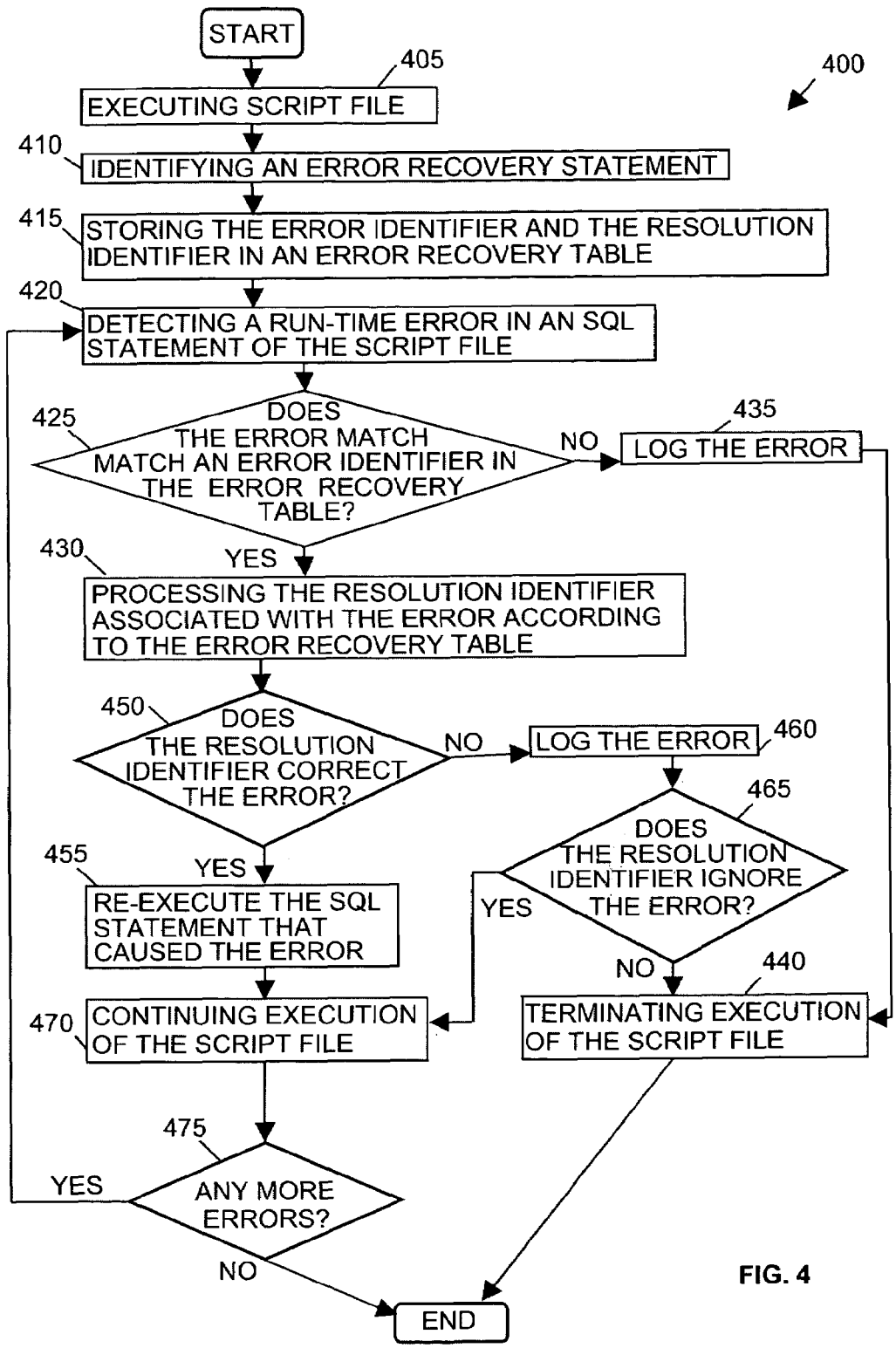
FIG. 4 depicts a flowchart of an embodiment for error-recovery from execution of a SQL script.

Turning now to FIG. 4, another aspect of the invention is disclosed. Flowchart 400 describes embodiments for handling error conditions resulting from execution 405 of a script file in a computer system such as computer system 200. When execution of the script file proceeds and SQL command line processor 221 detects an on-error statement, SQL command line processor 221 proceeds to identify 410 an error condition and a corresponding error-recovery statement. The computer system then stores 415 the error identifier and a resolution identifier in an error-recovery table. As explained above, the error identifier describes one or more error messages selected from a list of error messages and the resolution identifier describes one or more error-recovery statements, stored procedure calls, or the like.

After storing 413 the identifiers from the on-error statement in a table, the remainder of the script may be executed sequentially until an error is encountered. In some embodiments, the on-error statement may be located immediately before (based upon the order of execution), or at least near, the script file statement that is expected to have one of the errors described in the on-error statement.

Upon detecting 420 a run-time error in the SQL statement of the script file, the corresponding error message is compared with the error-recovery table to determine whether the error is one anticipated by an on-error statement. If not, the processing module logs the error 435 and terminates 440 execution of the script file.

On the other hand, if the error message matches an error condition in the error-recovery table, the processing module 430 processes the resolution identifier associated with the error according to the error-recovery table. If processing 430 the resolution identifier is not configured to correct the error, element 450, the error is logged 460. And if the resolution identifier is configured to ignore the error, element 465, the script continues to execute. Otherwise, execution of the script file terminates 440.

If processing 430 the resolution identifier is configured to correct the error, element 450, the error is corrected and the execution module re-executes 455 the command line that caused the error. The execution module then continues 470 to execute the script file(s) and if additional errors are forthcoming, element 475, the run-time errors are detected 420 and resolved as discussed above.

Turning now to FIG. 5A, a yet another aspect of the invention is disclosed. An embodiment of a SQL, script 500 with error-handling capability is illustrated. The SQL script 500 may include a script file such as script files 150 from FIG. 1 and/or script files 223 from FIG. 2. SQL script 500 includes an error condition identifier 510 that provides a list of errors anticipated by a script developer for one or more command lines of SQL script 500. The script developer also defines a resolution identifier 550 for each error or set of errors in the form of one or more statements like the on-error statement discussed above and described with respect to FIG. 5B. The resolution identifier 550 associates the error condition with the resolution statement. In the present example, the resolution identifier 550 includes provision for identifying errors that will occur upon execution of one or more script file command lines and the resolutions thereof includes error-recovery statements such as "Log and Quit," 520, "Log and Continue" 525, "Ignore and Quit" 530, "Ignore and Continue" 535, and "Remove Error Condition and Execute Prior Statement" 540, as described with regards to FIGS. 2 and 3.

Turning now to FIG. 5B, an example of a SQL script 570 utilizing concept discussed herein is illustrated. In this example when the script is executed for the first time, an error-recovery statement table such as table of error-recovery statements 545 is created in response to command line 575 and a table named 'mytable' is created in response to command line 580. No execution error occurs and, therefore, no error messages are generated. On any subsequent execution, 'mytable' already exists and, therefore, a SQL command line processor such as SQL processor 130 from FIG. 1, generates a run-time error message such as "SQL0601N" and/or "DB21034E". In this example the meaning of these error messages are as follows:

SQL0601N=Nature of the object to be created is identical to the existing name of type table.

DB21034E=The command was processed as an SQL statement because it was not a command line processor command.

"SQL0601N, DB21034E" represents the error condition identifier 510 of FIG. 5A and includes two error messages. "DROP TABLE mytable" represents resolution identifier 550.

During execution of the script, the SQL command line processor 300 recognizes these error messages, associates them with resolution identifier "DROP TABLE mytable", thus, deleting "mytable" and thereby removing or correcting for the error condition. Then, when command line 580 is re-executed, a table named "mytable" does not already exist so no error message is generated.

Another embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However; it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method of processing a sequential query language (SQL) script with a command line processor, the method comprising:

storing an association between an error condition and an error-recovery statement based upon execution of an on-error statement in the SQL script, wherein the error-recovery statement comprises an SQL statement;

determining an occurrence of the error condition, the error condition corresponding to an error message generated by the command line processor in response to the execution of the SQL script;

identifying the association between the error-recovery statement and the error condition; and executing the SQL statement of the error-recovery statement to resolve the occurrence of the error condition.

2. The method as in claim 1, wherein storing the association comprises generating an error-recovery table in response to execution of the on-error statement, the error recovery table having the error message and the error-recovery statement.

3. The method as in claim 1, wherein determining the occurrence of the error condition comprises detecting a run-time error in another SQL statement of the SQL script.

4. The method as in claim 1, wherein identifying the association comprises selecting the error-recovery statement to identify a way to handle the error condition.

5. The method as in claim 1, wherein identifying the association comprises looking up the error message in an error-recovery table.

6. The method as in claim 1, wherein executing the SQL statement of the error-recovery statement comprises ignoring the error condition.

7. The method as in claim 1, wherein executing the SQL statement of the error-recovery statement comprises logging the error condition.

8. The method as in claim 1, wherein executing the SQL statement of the error-recovery statement comprises removing the error condition, wherein the error condition is generated in response to execution of one of the SQL statements of the SQL script and re-executing the one of the SQL statements after handling the error condition.

9. A command line processor comprising:

an execution module to store an association between an error condition and an error-recovery statement based upon execution of an on-error statement in a script file, wherein the error recovery statement comprises at least one script statement, the execution of the at least one script statement conditioned on an occurrence of the error condition, and to determine the occurrence of the error condition, the error condition corresponding to an error message generated by the command line processor in response to the execution of the script file;

a logic module to identify the association between the error-recovery statement and the error condition for the script file, to select the error-recovery statement based upon the association; and a processing module to execute the at least one script statement of the error-recovery statement to resolve the occurrence of the error condition.

10. The command line processor as in claim 9, wherein the execution module is designed to generate an error-recovery table for storing the association in response to execution of the on-error statement, the error message table having the error message and the error-recovery statement.

11. The command line processor as in claim 10, wherein the logic module is to search the error recovery table for the error message to select the error-recovery statement.

12. The command line processor as in claim 9, wherein the processing module is to ignore the error condition based upon the error-recovery statement.

13. The command line processor as in claim 9, wherein the processing module is to log the error condition.

14. The command line processor as in claim 9, wherein the processing module is to execute the error-recovery statement to remove the error condition associated with a script file statement during execution of the script file and re-execute the script file statement, after execution of the error-recovery statement to continue execution of the script file.

15. A machine-accessible medium containing instructions, which when executed by a machine, cause the machine to perform operations, comprising:

storing an association between an error condition and an error-recovery statement based upon execution of an on-error statement in a script file, wherein the error-recovery statement comprises a script statement;

determining an occurrence of the error condition, the error condition corresponding to an error message generated by the command line processor in response to the execution of the script file;

identifying the association between the error-recovery statement and the error condition; and executing the script statement of the error-recovery statement to resolve the occurrence of the error condition.

16. The machine-accessible medium as in claim 15, wherein storing the association comprises generating an error-recovery table in response to execution of the on-error statement, the error message table having the error message and the error-recovery statement.

17. The machine-accessible medium as in claim 15, wherein determining the occurrence of the error condition comprises detecting a run-time error in a SQL statement of the script tile.

18. The machine-accessible medium as in claim 15, wherein identifying the association comprises selecting the error-recovery statement.

19. The machine-accessible medium as in claim 16, wherein identifying the association comprises the error-recovery statement comprises looking up the error message in an error-recovery table.

20. The machine-accessible medium as in claim 16, wherein executing the error-recovery statement comprises ignoring the error condition.

21. The machine-accessible medium as in claim 16, wherein executing the error-recovery statement comprises logging the error condition.

22. The machine-accessible medium as in claim 16, wherein executing the error-recovery statement comprises executing the error-recovery statement to remove the error condition and re-executing a script file statement, the execution of which caused the error condition.

23. A computer program product comprising:

a computer usable medium having an SQL script for handling an error condition, the script comprising:

an error condition identifier to identify an error message to be generated by a command line processor in response to an error during execution of the script; and a resolution identifier comprising an error-recovery statement with at least one script statement to associate the error message with the error-recovery statement, wherein execution of the error-recovery statement is designed to resolve the error condition.

24. The computer program product of claim 23, wherein the error condition identifier comprises one or more error messages.

25. The computer program product of claim 23, wherein the resolution identifier comprises a reference to a stored procedure.

26. The computer program product of claim 23, wherein the resolution identifier comprises an error-recovery statement to log the error condition.

27. The computer program product of claim 23, wherein the resolution identifier comprises an error-recovery statement to ignore the error condition.

28. The computer program product of claim 23, wherein the resolution identifier comprises an error-recovery statement to remove the error condition and to continue execution of the script.

* * * * *